United States Patent Office

3,094,500
Patented June 18, 1963

3,094,500
VINYL ESTER POLYMER EMULSIONS CONTAINING POLYVINYL ALCOHOL
Stedman C. Herman, Springfield, Mass., assignor to Shawinigan Resins Corporation, Springfield, Mass., a corporation of Massachusetts
No Drawing. Filed Aug. 31, 1959, Ser. No. 836,930
4 Claims. (Cl. 260—29.6)

This invention pertains to aqueous polyvinyl ester emulsions. More particularly, this invention pertains to aqueous polyvinyl ester emulsions containing a particular polyvinyl alcohol protective colloid and the improved products obtained therefrom.

It is well known to incorporate polyvinyl alcohol protective colloids in aqueous polyvinyl acetate emulsions, which compositions are particularly suitable as adhesives and surface coatings. These protective colloids are perhaps the most widely used commercially in the emulsion polymerization of vinyl esters and exhibit excellent compatibility and stability in the final emulsion. It would be desirable to increase the amounts of these particular colloids in the emulsion over that required to produce a stable emulsion for the particular applications hereinbefore listed, namely, adhesives and surface coatings. For example, the addition of larger amounts of polyvinyl alcohol protective colloids would increase the adhesiveness of the film. The amounts of polyvinyl alcohol employed, however, have been uniformly less than 6% by weight of the emulsion, since larger amounts of the available polyvinyl alcohol emulsifier requires that the preparation of the emulsion on a commercial basis, be undesirably modified. A further problem arising with the utilization of greater than 6% of the available polyvinyl alcohol protective colloids in aqueous polyvinyl ester emulsions is an undesired increase in the viscosity of the emulsion. This results in poor application properties of the emulsion where it is desired to apply the coating or adhesive films with the high speed coating machines currently in use. The application of such overly viscous emulsions requires that slower machine speeds be employed to insure the coating of a uniform layer of the emulsion on the substrate. High viscosity emulsions also restrict the incorporation of fillers useful to increase the percent solids of a coating and thereby decrease its drying time. The incorporation of fillers to an already viscous emulsion further increases the viscosity, hence further reduces machine coater speeds.

The applicant has found that by polymerizing vinyl ester monomers by the emulsion method in the presence of critical amounts of at least 10% of a low molecular weight 70–90% hydrolyzed polyvinyl ester having a viscosity of 1.2 to 3.0 centipoises for a 4% aqueous solution at 20° C., that emulsions of the vinyl ester polymers could be obtained which produce films which have excellent remoistenability, clarity and gloss. The applicant has further found that a vinyl ester polymer emulsion containing at least 55% solids and yet of relatively low emulsion viscosity, namely, less than 1000 centipoises could be obtained by this process. Still further, applicant has found that emulsions containing at least 10% protective colloid can be produced by the well known batch polymerization method as distinct from the delayed process generally employed for emulsion systems containing more than a few percent of a polyvinyl alcohol protective colloid. That 10% or more of a polyvinyl alcohol protective colloid can be added at the initiation of the polymerization process and the polymerization thereafter carried out without coagulation of the resulting emulsion is surprising since the expected effect of an increase of protective colloid is to decrease the vinyl ester polymer particle size as well as increase the viscosity of the polymerization mixture, thereby doubly promoting coagulation of the emulsion. The applicant has learned, however, that the more economically attractive batch process may be used when 10% or more of the particular polyvinyl alcohol hereinbefore disclosed is used as the sole protective colloid.

The invention may be practiced in its preferred embodiment as shown in the following examples, but is not limited thereto. Where parts and percentages are shown hereinafter in the specifications and claims, they are parts and percentages by weight.

*Example 1*

An aqueous vinyl acetate homopolymer emulsion was prepared from the following composition:

| | Parts |
|---|---|
| Water | 349 |
| Buffer (4% aqueous solution of sodium bicarbonate) | 13 |
| Protective colloid (low viscosity polyvinyl alcohol obtained by the hydrolysis of 73% to 77% of the ester groups of a polyvinyl ester) | 100 |
| Dispersant (dioctyl ester of sodium sulfosuccinic acid) | 1.6 |
| Vinyl acetate monomer | 537 |
| Catalyst (35% aqueous solution of hydrogen peroxide) | 3 |

The catalyst, buffer solution, dispersant and polyvinyl alcohol constituents shown above were mixed with the water at room temperature and with agitation to yield a solution. To this solution was added the entire vinyl acetate monomer with continued agitation. The reaction mixture was heated to reflux for approximately 2 to 2½ hours at which time the polymerization was substantially complete and the temperature of the polymerization mass had risen to approximately 92° C. The polymer emulsion so formed was a smooth stable mixture having a total solids of 61% and a pH of 5.2. The emulsion viscosity measured at room temperature with a Brookfield viscosimeter was approximately 680 centipoises. The storage stability of the emulsion was measured by a dilution stability test, wherein a 10 ml. sample of the emulsion was first diluted with 90 ml. of water and left to stand for a 24 hour period. No settling of the emulsion was observed after the waiting period.

Films cast from the emulsion and air dried were clear, possessed very high gloss, and re-emulsified readily. The adhesive bond time for such films was approximately 19 seconds. The adhesive bond time is a measurement obtained by casting approximately 5 mm. thick films from the emulsion between two pieces of ordinary 1 to 2 mm. thick paper and forming a sandwich thereof, thereafter pulling apart the paper layers at one second intervals until sufficient adhesive force has been obtained from the drying film so that failure of the paper results.

*Example 2*

To illustrate the necessity for concentrations of at least 10% of the particular polyvinyl alcohol protective colloid that is useful in the practice of the present invention, an aqueous polyvinyl acetate emulsion was prepared with a lesser amount of the protective colloid from the following composition:

| | Parts |
|---|---|
| Water | 1600 |
| Buffer (4% aqueous solution of sodium bicarbonate) | 2 |
| Protective colloid (low viscosity polyvinyl alcohol obtained by the hydrolysis of 70% to 90% of the ester groups of a polyvinyl ester) | 200 |
| Dispersant (dioctyl ester of sulfosuccinic acid) | 4.8 |

|                                                  | Parts |
|---|---|
| Vinyl acetate monomer                           | 2148 |
| Catalyst (35% aqueous solution of hydrogen peroxide) | .3 |

When the above reaction mixture was prepared and polymerized according to the method described in Example 1 the entire polymerization mass coagulated.

*Example 3*

An aqueous polyvinyl acetate emulsion was prepared from the following composition:

|  | Parts |
|---|---|
| Water | 525 |
| Protective colloid (low viscosity polyvinyl alcohol obtained by the hydrolysis of 70% to 90% of the ester groups of a polyvinyl ester) | 150 |
| Catalyst (lauroyl peroxide) | .9 |
| Dispersant (dioctyl ester of sulfosuccinic acid) | 1.8 |
| Vinyl acetate monomer | 816 |

The polymerization was complete according to the method described in Example 1. A smooth stable emulsion resulted having a total solids of approximately 61% and a pH of 5.6. The emulsion viscosity measured 940 centipoises. The emulsion and film properties were comparable to those obtained in Example 1. The heat seal temperature for air dried films obtained from the emulsion was approximately 150° C.

*Example 4*

To illustrate that larger proportions of the polyvinyl alcohol protective colloid can be used in practice of the present invention, an aqueous polyvinyl acetate emulsion was prepared from the following composition:

|  | Parts |
|---|---|
| Water | 525 |
| Protective colloid (low viscosity polyvinyl alcohol obtained by the hydrolysis of 70% to 90% of the ester groups of a polyvinyl ester) | 180 |
| Buffer (4% aqueous solution of sodium bicarbonate) | 19 |
| Catalyst (35% aqueous solution of hydrogen peroxide) | .3 |
| Dispersant (dioctyl ester of sulfosuccinic acid) | 1.5 |
| Vinyl acetate monomer | 763 |

The polymerization reaction was according to the method described in Example 1. A smooth stable emulsion was obtained having a total solids of approximately 60% and a pH of 5.3. The emulsion viscosity was approximately 840 centipoises. The emulsion and film properties were comparable to those obtained for the composition of Example 1 except that the adhesive bond time for the present composition was 23 seconds.

The present aqueous emulsions comprise stable, small particle size dispersions of individual discrete vinyl ester polymer resin particles having an average size of 1 to 1.5 microns diameter, and containing at least 10% of a low molecular weight 70 to 90% hydrolyzed polyvinyl ester as the sole protective colloid. The emulsions may be further characterized as possessing relatively low emulsion viscosities not exceeding 1,000 centipoises for an emulsion containing at least 55% total solids. The emulsions can best be characterized from the properties of the air dried films obtained therefrom, which films are readily remoistenable and possess excellent gloss and clarity. In addition the films when cast have good quick tack and after normal air drying, exhibit little or no blocking under usual conditions.

The vinyl ester monomers which are useful in the preparation of the polymer emulsions of the present invention can be selected from the general class of polymerizable film-forming monoethylenically unsaturated vinyl esters of organic acids together with such other monoethylenically unsaturated esters of dicarboxylic acids as are copolymerizable therewith. Suitable vinyl ester monomers include vinyl acetate, vinyl propionate, vinyl butyrate, vinyl valerate, vinyl hexate, vinyl benzoate, vinyl stearate, vinyl phenylacetate, and the like.

Vinyl acetate is the preferred monomer because of its relatively low cost and lower viscosities of the polymer emulsion. Low viscosity emulsions are commercially desirable whenever films are cast especially when cast with the high speed coaters hereinbefore mentioned.

The comonomers which may be used along with the vinyl ester monomer in the preparation of the adhesive emulsions include both other homopolymerizable vinyl ester monomers, such as vinyl stearate, as well as such other non-homopolymerizable esters as dibutyl maleate, diethyl fumarate, dioctyl maleate, mono-alkyl maleates and the like. Suitable comonomers may be selected from the general class of ethylenically unsaturated compounds copolymerizable with vinyl esters.

The polyvinyl alcohol protective colloids which are useful for the practice of the present invention are available and may be selected from the general class of hydrolyzed polyvinyl esters. The preparation of suitable polyvinyl alcohols is well known, such as taught in U.S. 2,643,994. The suitable class of polyvinyl alcohol protective colloids may be characterized as low molecular weight water-soluble polymers having a residual ester content of approximately 19% to 42% by weight corresponding to a percent hydrolysis of 90% to 70% respectively. The molecular weight of the suitable polyvinyl alcohol protective colloids can best be characterized by the viscosity of a 4% by weight aqueous solution of the polymer which viscosity ranges from 1.2 to 3.0 centipoises at 20° C.

It is especially preferred to utilize a hydrolized polyvinyl acetate protective colloid having a viscosity at 20° C. for a 4% aqueous solution of the polymer of 1.3–2.0 centipoises, a degree of hydrolysis of approximately 73–77.0% and a corresponding residual acetate content of 42–37% by weight. Use of the preferred protective colloid results in lower emulsion viscosities than will be obtained with the higher molecular weight protective colloids.

Various compounds in the class of free radical initiators can be substituted for the peroxide polymerization catalyst used in the preceding examples. For example, other peroxides of the water soluble type such as sodium peroxide, potassium peroxide and urea peroxide, as well as the oil soluble type such as acetyl peroxide, oleyl peroxide. Also, various per compounds may be used in place of the peroxides, such as peracetic acid, sodium perborate, potassium perborate, sodium persulfate, and the like.

In some of the above examples the addition of a sodium bicarbonate solution during the polymerization was shown. The purpose of the addition is to offset undesired acidity in the reaction mixture, and is not essential for producing stable fine grain emulsions. In place of the sodium bicarbonate, other alkaline materials may be used if one so desires, as for example sodium carbonate, potassium carbonate, potassium bicarbonate, sodium hydroxide; water soluble amines, for example, ethylene diamine, quaternary ammonium bases, and the like.

The dispersants used in the above examples can be selected from the general class of surfactant materials including anionic, cationic, and nonionic type. Especially preferred are the sodium and potassium sulfonates of organic compounds containing 10 to 20 carbon atoms, such as the sodium salt of dioctyl sulfosuccinic acid used in the preceding examples. The suitable dispersing agents are those which are water soluble and non-polymerizable with the vinyl ester monomer.

Other polymerization temperatures may be used, the exact temperature depending in part upon the nature of the polymer desired and on the volatility of the materials used. When necessary to avoid the escape of volatile materials, the polymerization may be carried out under pressure and with a closed system. However, temperatures between 60° C. and 100° C. are usually employed for emulsion polymerization with the upper temperatures reserved for a pressurized system.

It is not intended to limit the present invention to the particular compositions and specific applications hereinbefore disclosed. It will be obvious to the man skilled in the art that not only other compositions are apparent, but also that other applications may be especially benefitted by the use of such composition without departing from the spirit of the invention.

What is claimed is:

1. A stable aqueous vinyl ester polymer emulsion comprising 50% up to about 60% by weight of the emulsion of discrete vinyl ester polymer particles having an average size range of 1–1.5 microns diameter, said emulsion—
    (A) having a viscosity below 1,000 centipoises at 25° C.
    (B) forming films which on air drying are remoistenable and possess high gloss and clarity
    (C) being produced by polymerization of an aqueous dispersion of
        (a) a vinyl ester of an organic acid
        (b) at least 10% to about 12% by weight of the emulsion of a polyvinyl alcohol having a viscosity of 1.3 to 3 centipoises for a 4% aqueous solution at 20° C. which was prepared by the hydrolysis of 70 to 90% of the ester groups of a polyvinyl ester
        (c) a minor amount of a dispersant taken from the group consisting of water-soluble, anionic, cationic and non-ionic organic surfactants.

2. An emulsion according to claim 1 wherein the vinyl ester is vinyl acetate.

3. An emulsion according to claim 1 wherein the polyvinyl alcohol has a viscosity of 1.3 to 2.0 centipoises for a 4% aqueous solution at 20° C.

4. An emulsion according to claim 1 wherein the polyvinyl alcohol is a 73 to 77% hydrolyzed polyvinyl acetate.

References Cited in the file of this patent

UNITED STATES PATENTS

| | | |
|---|---|---|
| 2,398,344 | Collins et al. | Apr. 16, 1946 |
| 2,422,646 | Starck | June 17, 1947 |
| 2,694,052 | Canterino | Nov. 9, 1954 |
| 2,850,468 | Giggey | Sept. 2, 1958 |
| 2,850,471 | Klein | Sept. 2, 1958 |
| 2,892,802 | Budewitz | June 30, 1959 |